United States Patent
Kondo et al.

(10) Patent No.: US 9,652,155 B2
(45) Date of Patent: May 16, 2017

(54) COMPUTER SYSTEM, CASH DATA MANAGEMENT METHOD, AND COMPUTER

(71) Applicant: Hitachi, Ltd., Tokyo (JP)

(72) Inventors: Nobukazu Kondo, Tokyo (JP); Ken Sugimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 14/642,873

(22) Filed: Mar. 10, 2015

(65) Prior Publication Data

US 2015/0268858 A1 Sep. 24, 2015

(30) Foreign Application Priority Data

Mar. 24, 2014 (JP) .................. 2014-060117

(51) Int. Cl.
G06F 3/00 (2006.01)
G06F 13/28 (2006.01)
G06F 5/00 (2006.01)
G06F 13/12 (2006.01)
G06F 13/38 (2006.01)
G06F 3/06 (2006.01)
H04L 29/08 (2006.01)

(52) U.S. Cl.
CPC ............ *G06F 3/061* (2013.01); *G06F 3/0653* (2013.01); *G06F 3/0656* (2013.01); *G06F 3/0689* (2013.01); *H04L 67/2842* (2013.01); *H04L 67/2852* (2013.01)

(58) Field of Classification Search
CPC ............ G06F 3/00; G06F 12/00; G06F 21/00
USPC .................... 710/4, 15, 22, 52, 68
See application file for complete search history.

(56) References Cited

U.S. PATENT DOCUMENTS

| | | | |
|---|---|---|---|
| 2001/0029519 A1* | 10/2001 | Hallinan ............... | G06F 9/5016 718/104 |
| 2002/0099908 A1 | 7/2002 | Yamamoto et al. | |
| 2005/0193167 A1* | 9/2005 | Eguchi .................. | G06F 3/061 711/114 |
| 2008/0028143 A1* | 1/2008 | Murase ................. | G06F 3/0613 711/114 |
| 2009/0024793 A1 | 1/2009 | Fontenot et al. | |
| 2011/0107241 A1* | 5/2011 | Moore ................. | G06F 17/3089 715/760 |

(Continued)

FOREIGN PATENT DOCUMENTS

JP 2000-293317 A 10/2000

*Primary Examiner* — Idriss N Alrobaye
*Assistant Examiner* — Getente A Yimer
(74) *Attorney, Agent, or Firm* — Mattingly & Malur, PC

(57) ABSTRACT

A computer system, comprising: a service server on which an application; a storage server for storing data used by the application; and a management server for managing the service server and the storage server, the service server including a cache device which a server cache for temporarily storing data is set, and including an operating system and an I/O request monitoring unit for monitoring an I/O request issued by the application, and issuing a dummy I/O request for controlling an arrangement of data in the server cache in a case where a predetermined condition is satisfied, the management server including a cache optimization unit for generating a control policy for issuing the dummy I/O request.

17 Claims, 6 Drawing Sheets

(56) References Cited

U.S. PATENT DOCUMENTS

2012/0297156 A1* 11/2012 Suzuki ................ G06F 3/0607
                                                        711/162

* cited by examiner

CONTROL INFORMATION

| APPLICATION ID | CONTROL TYPE | MONITORING ADDRESS | CONTROL POLICY |
|---|---|---|---|
| APPLICATION A | DATA READ AHEAD CONTROL | xxx.xxx.xxx.xxx | yyy.yyy.yyy.yyy; 5% |
| APPLICATION B | DATA PINNING CONTROL | xxx.xxx.xxx.yyy | xxx.xxx.xxx.yyy; 30msec;8% |
| ⋮ | ⋮ | ⋮ | ⋮ |

COMPUTER SYSTEM, CASH DATA MANAGEMENT METHOD, AND COMPUTER

CLAIM OF PRIORITY

The present application claims priority from Japanese patent application JP 2014-60117 filed on Mar. 24, 2014, the content of which is hereby incorporated by reference into this application.

BACKGROUND OF THE INVENTION

This invention relates to control of an arrangement of data on a cache of a service server.

In recent years, nonvolatile memories (NVM) such as a flash memory are used in various electronic devices. Unlike a hard disk drive (HDD), the nonvolatile memory does not involve a mechanical operation, and enables faster access than the HDD.

Nonvolatile memories are also used in enterprise applications such as a server and a storage system that need fast data access. In particular, nonvolatile memories mountable in servers become inexpensive, and are thus becoming popular.

As the related art, there is known a system in which a flash memory is used for a cache memory different from a main memory. For example, refer to US 2009/0024793 A1. In this case, based on access characteristics (such as an access frequency) of data, a cache driver included in an OS or the like operating on a server stores cache data in the flash memory, and ejects cache data from the flash memory. As a result, a high-speed data access can be realized.

Moreover, as related art, there is known a technology for a storage system, in which a hierarchical storage area is constructed from a storage medium with high an access performance and a storage medium with low access performance, and the storage area for storing data is changed based on access characteristics of the data. For example, refer to JP 2000-293317 A.

SUMMARY OF THE INVENTION

The cache driver controls data to be stored in the flash memory based on a cache control algorithm such as LRU. The cache driver can control data actually accessed, namely, data accessed within a short period of time. On the other hand, the cache driver cannot control data while considering an access characteristic of an application and a schedule of a service.

Therefore, there exists such a problem that a performance of the service as a whole cannot be increased. For example, in an application which scans a database, if management information used to read data is stored in a flash memory, data is sequentially read out from the database, and a general cache control algorithm thus ejects the management information from the cache memory. Therefore, the management information needs to be read each time data is read, and hence the general cache control algorithm does not effectively operate.

This invention has been made in view of the above-mentioned problem. Specifically, an object of this invention is to provide a computer system for realizing control of cache data considering access characteristics of an application and a schedule of a service.

The present invention can be appreciated by the description which follows in conjunction with the following figures, wherein: a computer system, comprising: a service server on which an application for carrying out predetermined processing operates; a storage server for storing data used by the application; and a management server for managing the service server and the storage server. The service server includes a first processor, a first memory coupled to the first processor, a cache device which is coupled to the first processor, and to which a server cache for temporarily storing data is set, and a first interface coupled to the first processor for coupling to another apparatus. The storage server includes a second processor, a second memory coupled to the second processor, a second interface coupled to the second processor for coupling to another apparatus, and a plurality of storage devices. The management server includes a third processor, a third memory coupled to the third processor, and a third interface coupled to the third processor for coupling to another apparatus. The service server has an operating system for controlling the service server, the operating system including a cache driver for controlling the server cache; and an I/O request monitoring unit for monitoring an I/O request issued by the application, and issuing a dummy I/O request for controlling an arrangement of data in the server cache in a case where a predetermined condition is satisfied. The management server has a cache optimization unit for generating a control policy for issuing the dummy I/O request, and setting the control policy to the I/O request monitoring unit. The cache optimization unit being configured to instruct the service server to carry out processing. The I/O request monitoring unit being configured to: monitor the I/O request issued by the application operating on the service server; and transmit monitoring information including an address of data of an access destination included in the I/O request and an identifier of an application that has issued the I/O request to the cache optimization unit in a case where the I/O request is detected, the cache optimization unit is configured to analyze the monitoring information, thereby generating the control policy.

According to one embodiment of this invention, independently of the cache control algorithm of the cache driver, the I/O request monitoring unit issues the dummy I/O request based on the control policy generated by the cache optimization unit analyzing the monitoring information, thereby optimizing the arrangement of data in the server cache. Consequently, a processing performance of the application can be increased.

The problems, structures and effects other than those described above are made clear by the following explanation of the embodiment.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Figure 1:
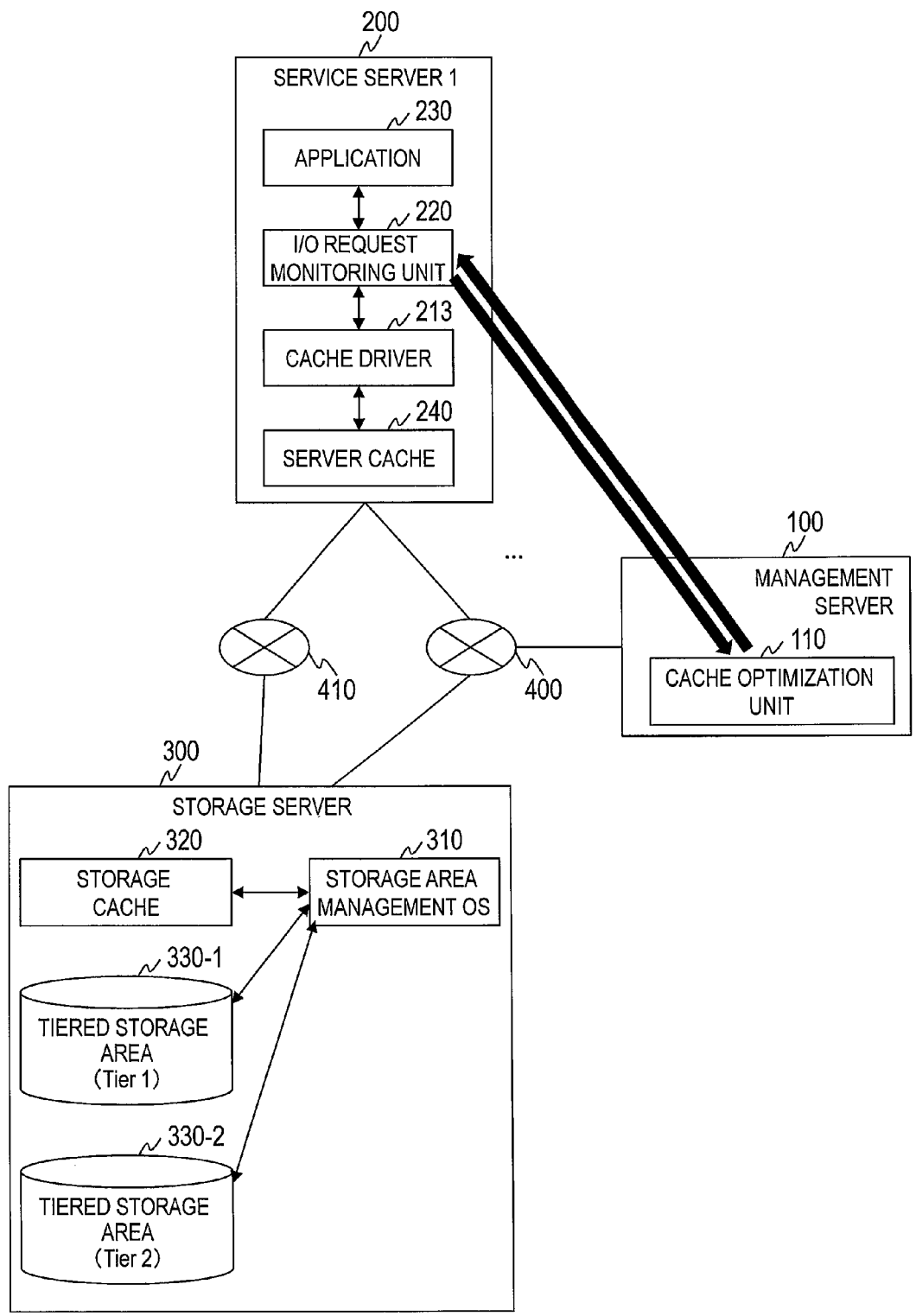
FIG. 1 is a block diagram illustrating the outline of this invention.

Now, an embodiment of this invention is described referring to the drawings.

FIG. 1 is a block diagram illustrating the outline of this invention.

A computer system illustrated in FIG. 1 includes a management server 100, a service server 200, and a storage server 300. It should be noted that the number of the service servers 200 and the number of the storage servers 300 may each be two or more.

The management server 100 is coupled to the service server 200 and the storage server 300 via a management network 400. Moreover, the service server 200 is coupled to the storage server 300 via a service network 410. It should be noted that, if the computer system includes a plurality of the service servers 200, the respective service servers 200 may be coupled to the storage server 300 via service networks different from one another.

The service server 200 is a computer for carrying out an arbitrary service, and at least one application 230 operates on the service server 200. Moreover, the service server 200 includes a cache driver 213 and a server cache 240. The server cache 240 is a storage area for temporarily storing data. The cache driver 213 is a module for controlling data stored in the server cache 240 based on an I/O request issued by the application 230.

The storage server 300 is a computer for providing a storage area used by the application 230 operating on the service server 200. The storage server 300 includes a storage area management OS 310 for managing the storage area. Moreover, the storage server 300 includes a storage cache 320 and a plurality of tiered storage areas 330. The storage cache 320 is a storage area for temporarily storing data. The tiered storage area 330 is a storage area to be provided to the service server 200.

In the example illustrated in FIG. 1, the storage server 300 includes two tiered storage areas 330-1 and 330-2 different from each other in an access performance. The storage server 300 provides at least one of the tiered storage areas 330-1 and 330-2 to the service server 200.

Therefore, data used by the application 230 is stored in at least one of the tiered storage areas 330-1 and 330-2. Moreover, data accessed by the application 230 is temporarily stored in the storage cache 320. The data used by the application 230 is hereinafter also referred to as application data.

In this invention, the management server 100 analyzes access characteristics of the application 230 on the service server 200, and then generates control information (control policy) for controlling an arrangement of the application data in the server cache 240. The arrangement of the application data in the server cache 240 means storing the application data in the server cache 240 and ejection of the application data stored in the server cache. Specifically, the following processing is carried out.

First, the management server 100 instructs the service server 200 to carry out a service in order to analyze the access characteristics of the application 230. It should be noted that the service includes at least one piece of processing. For example, a service such as a batch operation includes data collection processing and data analysis processing. Moreover, if the service includes a plurality of pieces of processing, the applications 230 for carrying out the respective pieces of processing may be different from one another.

When the service server 200 starts a service, an I/O request monitoring unit 220 of this service server 200 monitors an I/O request issued by the application 230. In a case where an I/O request is detected, the I/O request monitoring unit 220 generates I/O monitoring information. The I/O request monitoring unit 220 transmits the generated I/O monitoring information to a cache optimization unit 110 of the management server 100. It should be noted that the I/O request monitoring unit 220 may transmit the I/O monitoring information each time an I/O request is detected, or may transmit the I/O monitoring information after a predetermined number of I/O requests have been detected. Moreover, the I/O request monitoring unit 220 may periodically transmit the I/O monitoring information.

After the service of the service server 200 is finished, the cache optimization unit 110 analyzes the access characteristics of the application 230 based on the I/O monitoring information. The cache optimization unit 110 generates control information to be set to the service server 200 based on an analysis result of the access characteristics, and transmits the generated control information to the I/O request monitoring unit 220.

As used herein, the access characteristics of the application 230 represent characteristics of an access to application data in the entire service. In other words, important application data in the service, application data at an access destination changed when processing is switched, and the like can be recognized from the access characteristics of the application 230. In other words, the access characteristics of the application 230, which cannot be recognized based on accesses within a short period of time as in a general cache control algorithm, can be recognized.

In a case where the service of the service server 200 starts after the control information is set, the I/O request monitoring unit 220 monitors the I/O request issued by the application 230 based on the control information. In case where an I/O request including a predetermined address is detected, the I/O request monitoring unit 220 issues a dummy I/O request to the cache driver 213, thereby controlling the arrangement of the application data in the server cache 240.

As a result of the above-mentioned control, this invention provides the following effects.

The service server 200 uses a cache control algorithm of the cache driver 213 for accesses within a short period of time, and can realize the cache control of the application data based on the access characteristics of the application 230 in the service. Thus, the arrangement of the application data in the service can be optimized, and the processing performance of the application 230 in the service server 200 can be improved.

Moreover, if a plurality of service servers 200 are included in the computer system, the management server 100 can determine the control of the arrangement of the application data in all the services in the computer system, thereby improving a processing performance of the entire computer system.

First Embodiment

In a first embodiment of this invention, the application data is data in a file format, and application data in the file format is hereinafter also simply referred to as file. It should be noted that this invention is not limited by the data format of the application data.

Figure 2:
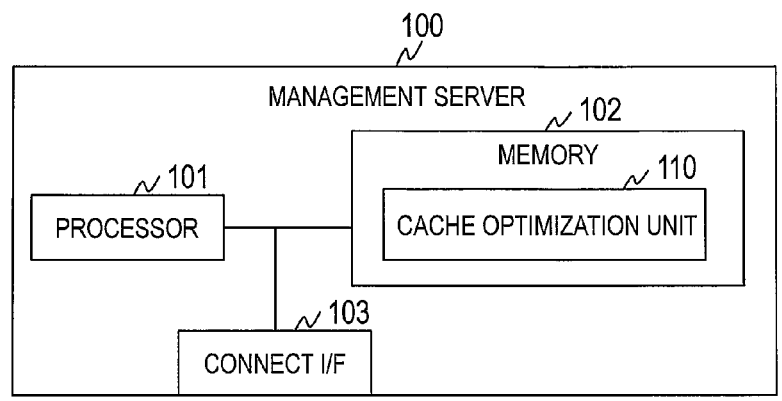
FIG. 2 is a block diagram illustrating a configuration example of a management server according to a first embodiment of this invention.

FIG. 2 is a block diagram illustrating a configuration example of the management server 100 according to the first embodiment of this invention.

The management server 100 includes a processor 101, a memory 102, and a connect interface 103, and the respective components are coupled to one another via internal paths. It should be noted that the management server 100 may include a storage apparatus and an input/output device. As the storage apparatus, for example, an HDD or the like is conceivable. Moreover, examples of the input/output device include a keyboard, a mouse, a touch panel, and a display.

The processor 101 executes programs stored in the memory 102. A function provided for the management server 100 is realized by the processor 101 executing the program. In the following, when a description is given of processing with emphasis on the function, the description represents a state in which a program for realizing the function is executed by the processor 101.

The memory 102 stores a program to be executed by the processor 101, and information necessary to execute this program. The memory 102 according to this embodiment stores a program for realizing the cache optimization unit 110.

Figures 5, 6:
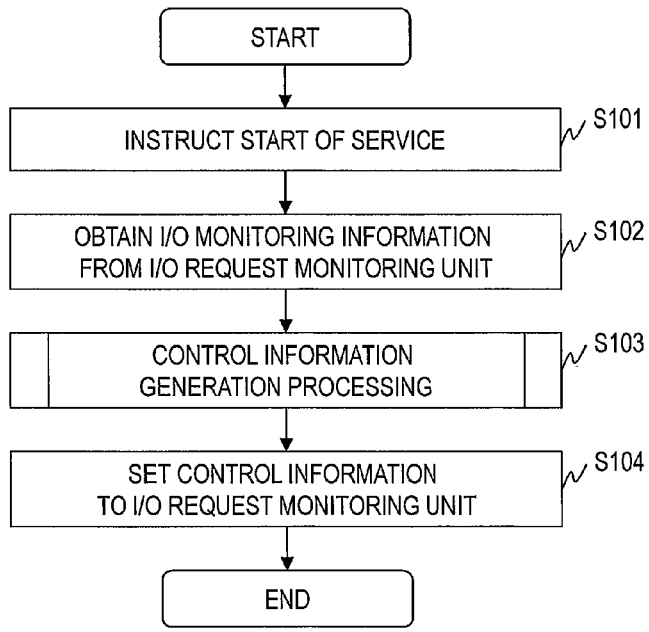
FIG. 5 is an explanatory diagram showing an example of control information according to the first embodiment of this invention.
FIG. 6 is a flowchart illustrating an analysis processing for an access characteristics carried out by a cache optimization unit according to the first embodiment of this invention.

The cache optimization unit 110 cooperates with the I/O request monitoring unit 220 of the service server 200 to control the arrangement of the application data in the server cache 240. Referring to FIG. 5, a description later given of the processing carried out by the cache optimization unit 110. The cache optimization unit 110 may hold service management information for managing the processing carried out by the application 230 operating on the service server 200. The service management information includes an identifier of a service, an identifier of the service server 200, an identifier of the application, an identifier of the application data, and a schedule, and the like.

The connect interface 103 is a device for coupling to an external apparatus such as the service server 200 and the storage server 300 via the management network 400. In a case where the management server 100 is coupled to the storage server 300 over a SAN, for example, a fiber channel (FC) adapter card is used as the connect interface 103. In a case where the management server 100 is coupled to the storage server 300 over a LAN, a network interface card (NIC) is used as the connect interface 103.

Figure 3:
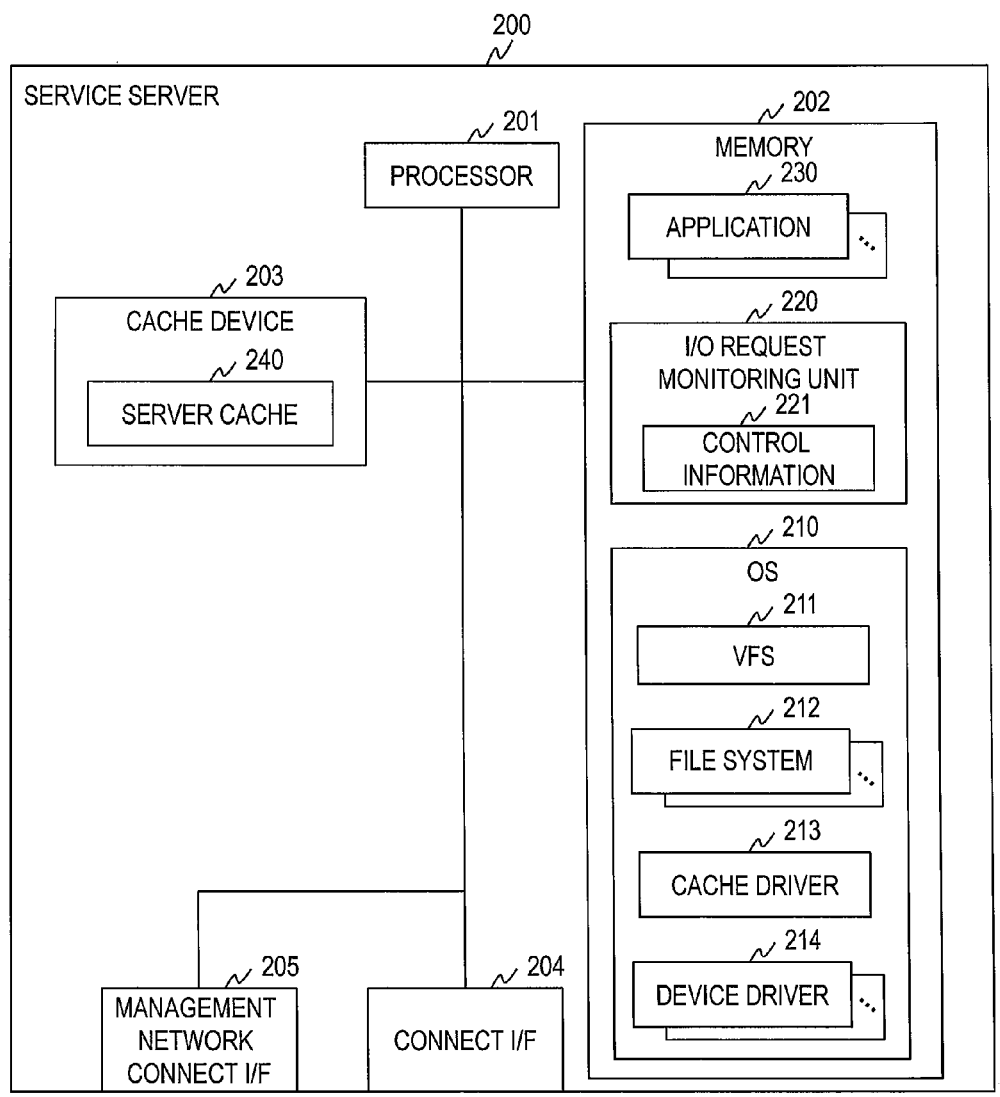
FIG. 3 is a block diagram illustrating a configuration example of a service server according to the first embodiment of this invention.

FIG. 3 is a block diagram illustrating a configuration example of the service server 200 according to the first embodiment of this invention.

The service server 200 includes a processor 201, a memory 202, a cache device 203, a connect interface 204, and a management network connect interface 205, which are coupled to one another via internal paths. It should be noted that the service server 200 may include a storage apparatus and an input/output device. As the storage apparatus, for example, an HDD or the like is conceivable. Moreover, examples of the input/output device include a keyboard, a mouse, a touch panel, and a display.

The processor 201 executes programs stored in the memory 202. A function provided for the service server 200 is realized by the processor 201 executing the program. In the following, when a description is given of processing with emphasis on the function, the description represents a state in which a program for realizing the function is executed by the processor 201.

The memory 202 stores a program to be executed by the processor 201, and information necessary to execute this program. A description is later given of the program and information stored in the memory 202.

The cache device 203 is a device for realizing the server cache 240 for temporarily storing application data accessed by the application 230. The entire storage area of the cache device 203 is used as the server cache 240. In this embodiment, it is assumed that a solid state drive (SSD) having a flash memory is used as the cache device 203. It should be noted that the cache device 203 is not limited to a nonvolatile memory such as a flash memory. For example, a volatile memory such as a DRAM may be used.

Data of a logical block unit of logical device (LD) is stored in the server cache 240 according to this embodiment. For example, a buffer cache may be used. The buffer cache is generated by assigning a buffer page to the server cache 240 and segmenting the buffer page into block buffers of a predetermined block size.

The buffer cache includes a buffer head for specifying a storage location for each of a pieces of the data of the logical block unit. It should be noted that a logical unit (LU) is provided by the storage server 300 as described later. In the following description, the data of the logical block unit is also described as block data.

In this embodiment, the service server 200 recognizes a logical device provided by the storage server 300 as a physical storage device. Moreover, the storage server 300 assigns at least one LU to the logical device, to thereby provide a storage area which can be used by the service server 200. It should be noted that this invention is not limited by how to provide the storage area. For example, the storage server 300 may assign at least one page of the LU to the logical device, to thereby provide a storage area to the service server 200.

The connect interface 204 is a device for coupling to external apparatus such as the storage server 300 via the service network 410. The management network connect interface 205 is a device for coupling to the management server 100 via the management network 400. It should be noted that the connect interface 204 and the management network connect interface 205 may be realized by one interface.

Next, the program and information to be stored in the memory 202 are described. The memory 202 according to this embodiment stores programs for realizing an operating system (OS) 210, the I/O request monitoring unit 220, and the application 230. The memory 202 may store another program and information.

The OS 210 provides a function to control the service server 200, and controls data transfer between the service server 200 and the logical device. The OS 210 includes a virtual file system (VFS) 211, a file system 212, a cache driver 213, and a device driver 214. The OS 210 includes function units (not shown), which are known and are not therefore described.

The VFS 211 provides a plurality of kinds of file systems 212 with a common interface. The VFS 211 converts an operation (reading, writing, or the like) on application data by the application 230 into an operation that depends on each file system 212.

The file system 212 provides a function for managing a piece of data of a block unit stored in a storage area as a file. In this embodiment, it is assumed that there exist a plurality of file systems 212. The OS 210 may include a single file system 212.

The OS 210 recognizes the logical device provided by the storage server 300 as a physical storage device, and formats the logical device, namely, an LU assigned to the logical device into a predetermined file system 212. At the time of formatting, the OS 210 divides the logical device into predetermined logical blocks, and assigns identification numbers to the respective logical blocks. The file system 212 manages data including at least one block data as a file.

The cache driver 213 controls the cache device 203. The device driver 214 controls devices, such as the connect interface 204, included in the service server 200.

The I/O request monitoring unit 220 monitors an I/O request issued by the application 230 based on control information 221 generated by the cache optimization unit 110 of the management server 100. Moreover, the I/O request monitoring unit 220 monitors an I/O request issued by the application 230 when the control information 221 is generated, and transmits I/O monitoring information, which is a result of the monitoring, to the cache optimization unit 110. Referring to FIG. 6, a description is later given of the control information 221.

It should be noted that the I/O request monitoring unit 220 may be built into the service server 200 in advance, or may be built into the service server 200 as an agent from the outside.

The application 230 performs arbitrary processing. This invention is not limited to the type and the contents of the processing of the application 230 that is executed on the service server 200.

It should be noted that the program and information to be stored in the memory 202 may be stored in the storage area provided by the storage server 300 or a storage apparatus provided in the service server 200. In this case, the processor 201 obtains the program and information from the storage server 300 or the storage apparatus, and loads the obtained program and information into the memory 202.

Figure 4:
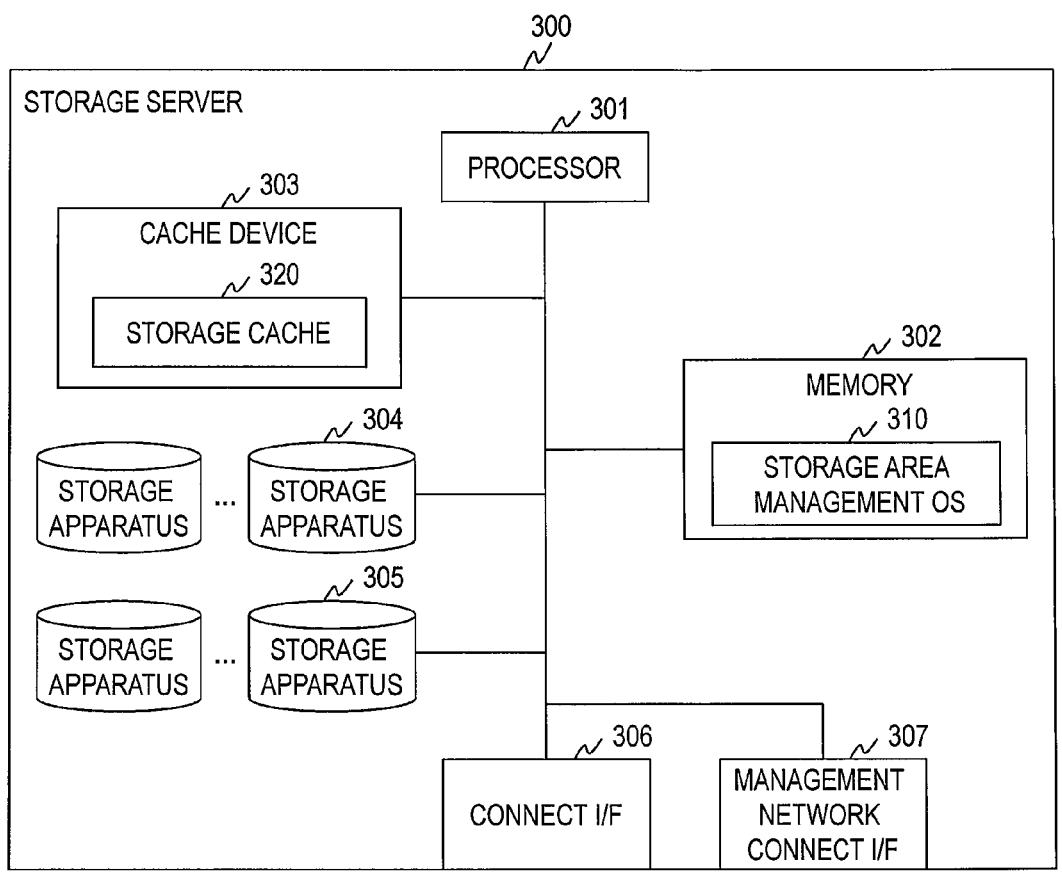
FIG. 4 is a block diagram illustrating a configuration example of a storage server according to the first embodiment of this invention.

FIG. 4 is a block diagram illustrating a configuration example of the storage server 300 according to the first embodiment of this invention.

The storage server 300 provides the storage area to the service server 200. The storage server 300 includes a processor 301, a memory 302, a cache device 303, a plurality of storage apparatus 304, a plurality of storage apparatus 305, a connect interface 306, and a management network connect interface 307, and the respective components are coupled to one another via internal paths. It should be noted that the storage server may include an input/output device. Examples of the input/output device include a keyboard, a mouse, a touch panel, and a display.

The processor 301 executes programs stored in the memory 302. A function provided for the storage server 300 is realized by the processor 301 executing the program. In the following, when a description is given of processing with emphasis on the function, the description represents a state in which a program for realizing the function is executed by the processor 301.

The memory 302 stores a program to be executed by the processor 301, and information necessary to execute this program. The memory 302 according to this embodiment stores a program for realizing the storage area management OS 310. It should be noted that the memory 302 may store other programs and pieces of information. For example, the memory 302 may store information for managing data stored in the storage apparatus 304 and 305 and the like.

The storage area management OS 310 controls the storage server 300. In this embodiment, the plurality of storage apparatus 304 and the plurality of storage apparatus 305 may be used to construct a RAID volume. The storage area management OS 310 logically divides the RAID volume into a plurality of logical units (LUs). The storage area management OS 310 provides at least one logical device to the management server 200, and assigns at least one LU to this logical device. In a case where a plurality of LUs are assigned to the logical device, LUs generated from RAID volumes on tiers different from one another can also be assigned.

The storage area management OS 310 holds management information representing correspondences among RAID volumes, LUs, and logical devices. Moreover, the storage area management OS 310 includes various functions such as a management function for LUs, a data transfer function, and a cache control function, but those functions are publicly-known technologies, and a description thereof is therefore omitted.

The cache device 303 is a device for realizing the storage cache 320 for temporarily storing application data accessed by the service server 200. The entire storage area of the cache device 303 is used as the storage cache 320.

It should be noted that the storage area management OS 310 includes a cache driver for carrying out cache control processing for the storage cache 320. This cache driver is publicly known, and is thus not shown.

In this embodiment, it is assumed that a solid state drive (SSD) having a flash memory is used as the cache device 303. It should be noted that the cache device 303 is not limited to a nonvolatile memory such as a flash memory. For example, a volatile memory such as a DRAM may be used.

In a case of receiving a read request from the service server 200, the cache driver of the storage system 300 returns data stored in the storage cache 320. In a case of receiving a write request from the service server 200, the storage server 300 writes data into the storage cache 320, notifies the service server 200 of the completion of the writing processing, and then writes the data into the storage apparatus 304 or the storage apparatus 305. The above-mentioned processing can speed up the response to the service server 200.

The connect interface 306 is a device for coupling to an external apparatus such as the service server 200 via the service network 410. In a case where the service server 200 is coupled to the storage server 300 over a SAN, for example, a channel adapter (CA) is used as the connect interface 306. In a case where the service server 200 is coupled to the storage server 300 over a LAN, a network interface card (NIC) is used as the connect interface 306.

The management network connect interface 307 is a device for coupling to the management server 100 via the management network 400.

The storage apparatus 304 and the storage apparatus 305 are apparatus for storing data. For example, the storage apparatus 304 and the storage apparatus 305 may be an HDD or SSD. It should be noted that the storage apparatus may be any apparatus that can store data. In this embodiment, the storage apparatus 304 is a high-speed HDD, and the storage apparatus 305 is a low-speed HDD.

It should be noted that the program and information to be stored in the memory 302 may be stored in the storage apparatus 304 or the storage apparatus 305. In this case, the processor 301 obtains the program and information from the storage apparatus 304 or the storage apparatus 305, and loads the obtained program and information into the memory 302.

FIG. 5 is an explanatory diagram showing an example of the control information 221 according to the first embodiment of this invention.

The control information 221 includes application IDs 501, control types 502, monitoring addresses 503, and control policies 504.

The application ID 501 is an identifier of an application 230 that has issued a detected I/O request. The control type 502 is a type of control processing carried out by the I/O request monitoring unit 220. In this embodiment, the control type 502 stores any one of "data read-ahead control" and "data pinning control".

In the "data read-ahead control", the I/O request monitoring unit 220 reads predetermined application data from the storage server 300 in advance, and stores the read application data in the server cache 240.

For example, in the case of a service including a first application for totaling data and a second application for analyzing data, in a case where the second application starts the processing, data used by this application needs to be read from the storage server 300. Therefore, a delay is generated in the processing by the second application.

Thus, the I/O request monitoring unit 220 issues a dummy I/O request for reading data to be used by the second application in advance at a predetermined timing through the "data read-ahead control" before the second application starts the processing. As a result, the data to be used by the second application is stored in the server cache 240 before the start of the processing by this application, and the processing performance can thus be improved.

In the "data pinning control", the I/O request monitoring unit 220 periodically reads predetermined application data stored in the sever cache 240.

For example, in a case where scan processing for application data stored in a database is carried out, the application data stored in the database is read in a predetermined sequence. In the above-mentioned application 230, if management information for managing the data to be read from the database is stored in the server cache 240, the management data is ejected from the server cache 240 during execution of the service. Therefore, in a case where the predetermined data is read out from the database, this management information needs to be read again from the storage server 300.

Thus, in a case where application data frequently read from the storage server 300 or important application data is stored in the serve cache 240, the I/O request monitoring unit 220 issues a dummy I/O request for periodically reading this application data through the "data pinning control". As a result, the application data is not ejected from the server cache 240, and the processing performance can be improved.

A description has been given of the control processing. A description is again given of FIG. 5.

The monitoring address 503 is an address monitored by the I/O request monitoring unit 220. In a case where the control type 502 is "data read-ahead control", an address serving as a trigger for issuing an I/O request is stored in the monitoring address 503. In a case where the control type 502 is "data pinning control", an address serving as a trigger of a start of a timer for measuring an issuance cycle of a dummy I/O request is stored in the monitoring address 503.

The control policy 504 represents control contents for the I/O request monitoring unit 220 to issue a dummy I/O request.

In a case where the control type 502 is "data read-ahead control", an address to be included in the dummy I/O request, and a ratio of an I/O band used when the dummy I/O request is issued are stored in the control policy 504. In a case where the control type 502 is "data pinning control", an address to be included in the dummy I/O request, an issuance cycle of the dummy I/O request, and a ratio of the I/O band used when the dummy I/O request is issued are stored in the control policy 504.

The ratio of the I/O band is included in the control policy 504 in order to issue the dummy I/O request within a range in which a load is not generated in the I/O band used by the service. It should be noted that the ratio of the I/O band may be set in advance, or may be set by an administrator or the like who operates the management server 100.

The control information 221 illustrated in FIG. 5 includes the two control methods, namely, "data read-ahead control" and "data pinning control", but may also store data relating to other control methods.

FIG. 6 is a flowchart illustrating an analysis processing for the access characteristics carried out by the cache optimization unit 110 according to the first embodiment of this invention.

In a case where the management server 100 receives an instruction to carry out processing from the administrator of the management server 100, or receives a request for generating control information 221 from a user using the service server 200, the management server 100 starts the analysis processing for the access characteristics described below.

In a case where a plurality of applications 230 are operating on the service server 200, all the applications are subject to the processing.

It should be noted that the identifier of the subject application 230 may be specified. Moreover, in a case where a plurality of service servers 200 are included in the computer system, the processing described below is carried out for all the service servers 200 or specified service servers 200.

The cache optimization unit 110 instructs the service server 200 to start a service (Step S101).

In a case where the service server 200 receives the instruction, the service server 200 starts the service. On this occasion, the I/O request monitoring unit 220 of the service server 200 starts the monitoring of the I/O request. In a case where an I/O request is detected, the I/O request monitoring unit 220 generates I/O monitoring information based on the detected I/O request, and transmits the generated I/O monitoring information to the cache optimization unit 110. The I/O monitoring information includes an identifier of the application, the address of data subject to the access, and a timestamp of when the I/O request is detected. The information included in the I/O monitoring information may be appropriately changed by the administrator. Moreover, in a case where the service is finished, the I/O request monitoring unit 220 transmits a service end notification to the cache optimization unit 110.

The cache optimization unit 110 obtains the I/O monitoring information from the I/O request monitoring unit 220 of the subject service server 200 (Step S102).

On this occasion, the cache optimization unit 110 temporarily stores the obtained I/O monitoring information in the memory 102 or an external storage apparatus. The cache optimization unit 110 accumulates the I/O monitoring information until the service end notification from the I/O request monitoring unit 220 is received. It should be noted that the cache optimization unit 110 may successively process the obtained I/O monitoring information as in stream data processing.

Figure 7:
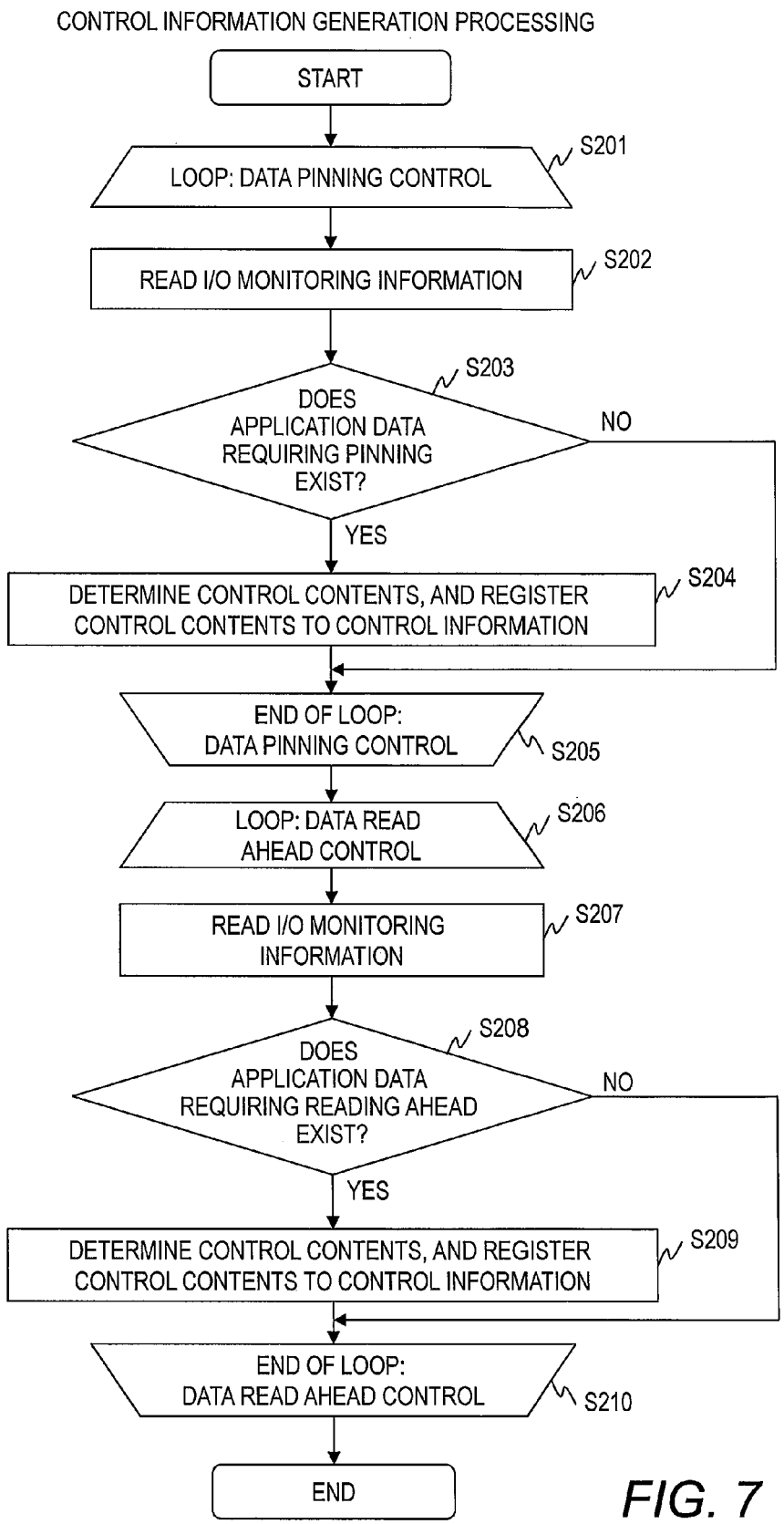
FIG. 7 is a flowchart illustrating control information generation processing carried out by the cache optimization unit according to the first embodiment of this invention.

The cache optimization unit 110 carries out control information generation processing based on the obtained I/O monitoring information (Step S103). Referring to FIG. 7, a description is later given of the control information generation processing.

The cache optimization unit 110 sets the generated control information 221 to the I/O request monitoring unit 220 (Step S104), and then finishes the analysis processing for the access characteristics. Specifically, the cache optimization unit 110 transmits the generated control information 221 to the I/O request monitoring unit 220.

FIG. 7 is a flowchart illustrating the control information generation processing carried out by the cache optimization unit according to the first embodiment of this invention.

The cache optimization unit 110 starts loop processing for the data pinning control (Step S201). The cache optimization unit 110 reads the I/O monitoring information (Step S202).

The number of pieces of the read I/O monitoring information depends on an analysis method, and the I/O monitoring information is read at a predetermined time interval such as every one hour. Moreover, the cache optimization unit 110 may obtain the application data subject to the access of an I/O request from the storage server 300 based on the read I/O monitoring information.

The cache optimization unit 110 analyzes the read I/O monitoring information, and determines whether application data requiring the pinning exists or not (Step S203). Specifically, the following processing is carried out.

The cache optimization unit 110 refers to addresses included in the I/O requests included in the predetermined time interval, and counts the number of I/O requests for each of the addresses. In a case where the number of the I/O requests is equal to or more than a threshold, the cache optimization unit 110 determines that application data requiring the pinning exists. It should be noted that the threshold is set in advance.

Moreover, as another piece of processing, the cache optimization unit 110 analyzes a content of the application data read from the storage server 300 based on the I/O monitoring information, and, in a case where the application data corresponds to the important information such as management information in the service, determines that application data requiring the pinning exists.

The above-mentioned analysis processing is an example, and this invention is not limited to this example. A description has been given of the processing in Step S203.

In a case where it is determined application data requiring the pinning does not exist, the cache optimization unit 110 proceeds to Step S205.

In a case where it is determined application data requiring the pinning exists, the cache optimization unit 110 determines control contents, and registers the determined control contents to the control information 221 (Step S204). Specifically, the following processing is carried out.

The cache optimization unit 110 determines an address for making access to the application data requiring the pinning, and an application 230 that uses this application data based on the I/O monitoring information. Moreover, the cache optimization unit 110 determines the issuance cycle of the dummy I/O request. The issuance cycle of the dummy I/O request is calculated, for example, as described below.

First, the cache optimization unit 110 calculates the issuance intervals of the I/O requests for reading the application data requiring the pinning based on the I/O monitoring information. The cache optimization unit 110 identifies the shortest issuance interval of the I/O request out of the calculated issuance intervals of the I/O requests. The cache optimization unit 110 determines one tenth of the identified shortest issuance cycle of the I/O request as the issuance interval of the dummy I/O request. A description has been given of the example of the calculation method for the issuance cycle of the dummy I/O request.

The cache optimization unit 110 determines the ratio of the I/O band used when the dummy I/O request is issued. In this embodiment, a ratio set in advance is used. It should be noted that in place of the ratio of the I/O band, a range of the ratio of the I/O band may be determined. As a result, the I/O request monitoring unit 220 can change the ratio of the I/O band to be used depending on an actually used state of the I/O band when the dummy I/O request is issued.

The cache optimization unit 110 adds one entry to the control information 221, sets the identifier of the application 230 that uses the application data requiring the pinning to the application ID 501 of the added entry, and sets "data pinning control" to the control type 502.

The cache optimization unit 110 sets the address for making access to the application data requiring the pinning to the monitoring address 503 of the added entry, and sets the address, the issuance cycle, and the ratio of the I/O band for making access to the application data requiring the pinning to the control policy 504. The same address is set to the monitoring address 503 and the control policy 504. A description has been given of the processing in Step S204.

The cache optimization unit 110 determines whether or not all the pieces of the I/O monitoring information stored in the memory 102 have been processed (Step S205).

In a case where it is determined that all the pieces of the I/O monitoring information stored in the memory 102 have not been processed, the cache optimization unit 110 returns to Step S202, and carries out the same processing.

In a case where it is determined that all the pieces of the I/O monitoring information stored in the memory 102 have been processed, the cache optimization unit 110 starts loop processing for the data read-ahead control (Step S206). The cache optimization unit 110 reads the I/O monitoring information (Step S207).

The number of pieces of the read I/O monitoring information depends on an analysis method, and the I/O monitoring information is read in units of the application 230. Moreover, the cache optimization unit 110 may obtain the application data subject to the access of an I/O request from the storage server 300 based on the read I/O monitoring information.

The cache optimization unit 110 analyzes the read I/O monitoring information, and determines whether service information requiring reading ahead exists or not (Step S208). Specifically, the following processing is carried out.

The cache optimization unit 110 identifies application data to be read by each of the applications 230 within a short period of time and in a large amount. For example, in a case where an I/O request for reading the same file is issued ten or more times within one minute, the cache optimization unit 110 identifies this file as application data to be read within a short period of time and in a large amount. In a case where application data to be read within a short period of time and in a large amount exists, the cache control algorithm determines that application data requiring reading ahead exists.

Moreover, as another method, the cache optimization unit 110 may recognize an execution sequence of the applications 230, and may treat application data, which is read when an arbitrary application 230 finishes processing and another application 230 starts processing after this arbitrary application 230, as data requiring the reading ahead.

The above-mentioned analysis processing is an example, and this invention is not limited to this example. A description has been given of the processing in Step S208.

In a case where it is determined that application data requiring the reading ahead does not exist, the cache optimization unit 110 proceeds to Step S210.

In a case where it is determined that application data requiring the reading ahead exists, the cache optimization unit 110 determines control contents, and registers the determined control contents to the control information 221 (Step S209). Specifically, the following processing is carried out.

The cache optimization unit 110 determines an address for making access to the application data requiring the reading ahead, and an application 230 that issues a dummy I/O request based on the I/O monitoring information.

The cache optimization unit 110 determines the ratio of the I/O band used when the dummy I/O request is issued. In this embodiment, a ratio set in advance is used. It should be noted that in place of the ratio of the I/O band, a range of the ratio of the I/O band may be determined. As a result, the I/O request monitoring unit 220 can change the ratio of the I/O band to be used depending on an actually used state of the I/O band when the dummy I/O request is issued.

The cache optimization unit 110 determines a monitoring address triggering the issuance of the dummy I/O request. The monitoring address triggering the issuance of the dummy I/O request is determined as described below, for example.

The cache optimization unit 110 identifies, based on the I/O monitoring information, an I/O request issued ten minutes before an I/O request for application data requiring the reading ahead is detected. The cache optimization unit 110 determines an address included in the identified I/O request as the monitoring address.

Moreover, the following method is conceivable. The cache optimization unit 110 identifies an application 230 issuing an I/O request for making access to application data requiring the reading ahead based on the I/O monitoring information and the service management information. The cache optimization unit 110 identifies, based on the service management information, an application 230 carrying out processing before this application 230. The cache optimization unit 110 identifies, based on the I/O monitoring information and the service management information, application data to which the identified application 230 makes access 10 minutes before the identified application 230 finishes the processing and determines the address of the application data as the monitoring address.

A description has been given of the example of the method of determining the monitoring address triggering the issuance of a dummy I/O request.

The cache optimization unit 110 adds one entry to the control information 221, sets the identifier of the application 230 that is determined to issue a dummy I/O request to the application ID 501 of the added entry, and sets "data read-ahead control" to the control type 502.

The cache optimization unit 110 sets the determined monitoring address to the monitoring address 503 of the added entry, and sets the address and the ratio of the I/O band for making access to the application data requiring the reading ahead to the control policy 504. A description has been given of the processing in Step S209.

The cache optimization unit 110 determines whether or not all the pieces of the I/O monitoring information stored in the memory 102 have been processed (Step S210).

In a case where it is determined that all the pieces of the I/O monitoring information stored in the memory 102 have not been processed, the cache optimization unit 110 returns to Step S207, and carries out the same processing.

In a case where it is determined that all the pieces of the I/O monitoring information stored in the memory 102 have been processed, the cache optimization unit 110 finishes the control information generation processing.

It should be noted that the loop processing for the read-ahead control may be carried out first. Moreover, after the control information generation processing is finished, the cache optimization unit 110 may delete the I/O monitoring information stored in the memory 102.

Figure 8:
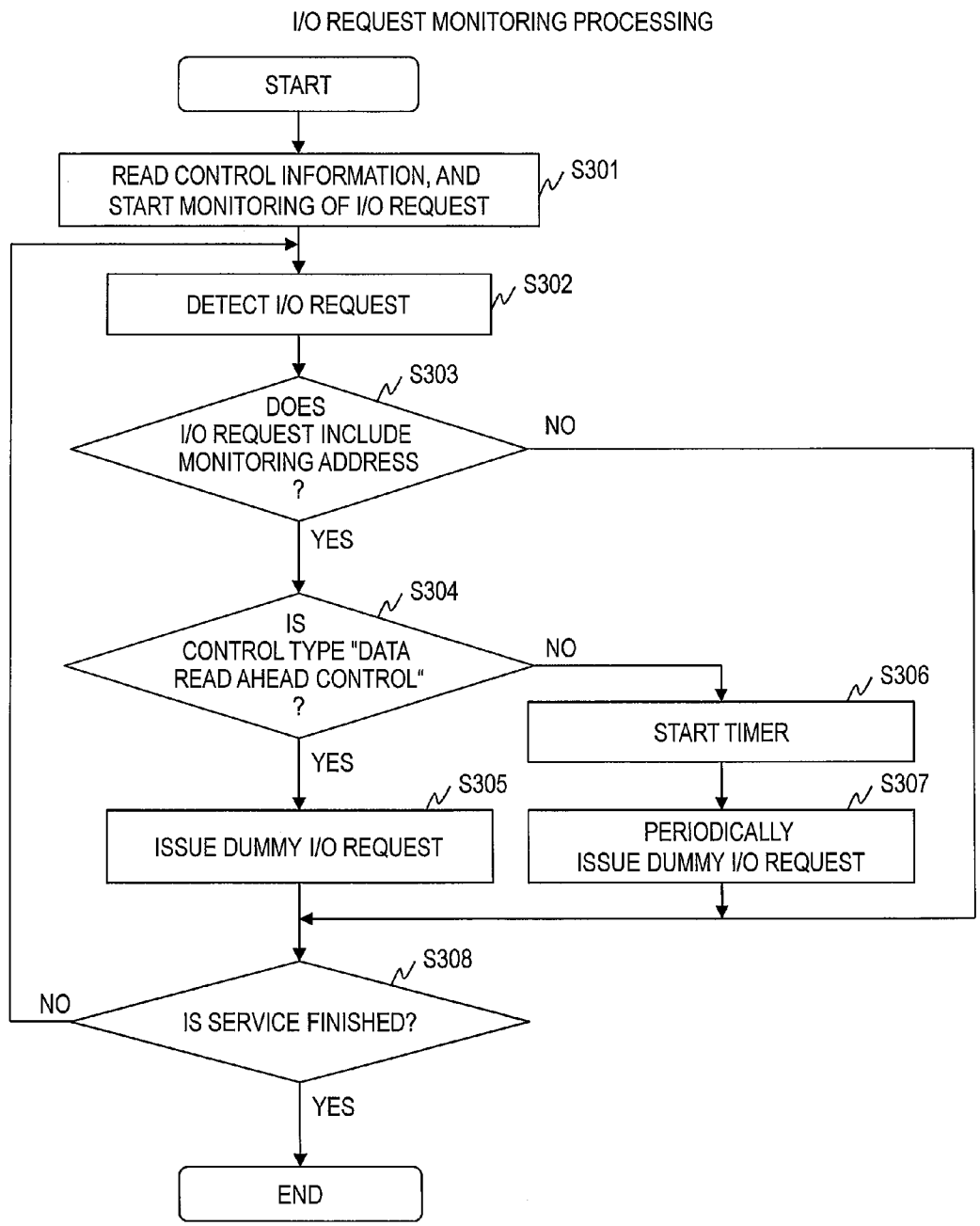
FIG. 8 is a flowchart illustrating I/O request monitoring processing carried out by an I/O request monitoring unit according to the first embodiment of this invention.

FIG. 8 is a flowchart illustrating the I/O request monitoring processing carried out by the I/O request monitoring unit 220 according to the first embodiment of this invention.

The I/O request monitoring unit 220 starts the I/O monitoring processing described below when a service is started after the control information 221 is set.

The I/O request monitoring unit 220 reads the control information 221 set by the cache optimization unit 110, thereby starting the monitoring of the I/O request (Step S301). The I/O request monitoring unit 220 traps the I/O request issued by the application 230, thereby detecting the I/O request (Step S302).

The I/O request monitoring unit 220 refers to the control information 221, thereby determining whether the detected I/O request is an I/O request including a monitoring address or not (Step S303).

Specifically, the I/O request monitoring unit 220 refers to the control information 221, thereby searching for an entry in which the identifier of the application that has issued the I/O request is stored in the application ID 501, and an address included in the I/O request is stored in the monitoring address 503. In a case where an entry matching the address included in the I/O request is retrieved, the I/O request monitoring unit 220 determines that the detected I/O request is an I/O request including the monitoring address.

In a case where it is determined that the detected I/O request is not an I/O request including the monitoring address, the I/O request monitoring unit 220 proceeds to Step S308.

In a case where it is determined that the detected I/O request is an I/O request including the monitoring address, the I/O request monitoring unit 220 determines whether the control type 502 of the retrieved entry is "data read-ahead control" or not (Step S304).

In a case where it is determined that the control type 502 of the retrieved entry is "data read-ahead control", the I/O request monitoring unit 220 issues a dummy I/O request based on the information set to this entry (Step S305). Then, the I/O request monitoring unit 220 proceeds to Step S308.

Specifically, the I/O request monitoring unit 220 uses the I/O band stored in the control policy 504, thereby issuing a dummy I/O request including an address stored in the control policy 504. On this occasion, the I/O request monitoring unit 220 sets the identifier of a dummy application 230 as an issuance source of the dummy I/O request. As a result, the I/O request monitoring unit 220 can receive a response to the dummy I/O request. The I/O request monitoring unit 220 receives application data as a response to the dummy I/O request, and may discard this application data.

In a case where the cache driver 213 receives the dummy I/O request, the cache driver 213 determines whether or not application data exists in the server cache 240. In a case where the application data does not exist in the server cache 240, the cache driver 213 issues an I/O request for requesting the storage server 300 to read the application data. Moreover, the cache driver 213 stores the data read from the storage server 300 in the server cache 240.

In a case where it is determined that the control type 502 of the retrieved entry is "data pinning control", the I/O request monitoring unit 220 starts the timer (Step S306). On this occasion, the issuance cycle stored in the control policy 504 of the retrieved entry is set to the timer.

In a case of being notified of an elapse of a period corresponding to the issuance cycle by the timer, the I/O request monitoring unit 220 periodically issues the dummy I/O request based on the information set in the retrieved entry (Step S307). Then, the I/O request monitoring unit 220 proceeds to Step S308.

Specifically, the I/O request monitoring unit 220 uses the I/O band stored in the control policy 504, thereby issuing a dummy I/O request including an address stored in the control policy 504. On this occasion, the I/O request monitoring unit 220 sets the identifier of a dummy application as an issuance source of the dummy I/O request. As a result, the I/O request monitoring unit 220 can receive a response to the dummy I/O request. It should be noted that the I/O request monitoring unit 220 may discard the data read from the server cache 240 as a result of the dummy I/O request.

In a case of receiving the dummy I/O request, the cache driver 213 determines whether or not application data exists in the server cache 240. On this occasion, the application data exists in the server cache 240, and the application data is thus read from the server cache 240. The access to the application data requiring the pinning is periodically detected. Therefore, even when the cache driver 213 carries out the cache control, for example, based on the LRU control, the application data is not evicted from the server cache 240.

The I/O request monitoring unit 220 determines whether the service has been finished or not (Step S308).

In a case where it is determined that the service has not been finished, the I/O request monitoring unit 220 returns to Step S302, and continues the monitoring of the I/O request. In a case where it is determined that the service has been finished, the I/O request monitoring unit 220 finishes the I/O request monitoring processing.

It should be noted that, in this embodiment, the cache optimization unit 110 is included in the management server 100 and the I/O request monitoring unit 220 is included in the service server 200, but this invention is not limited to this case. The service server 200 may include the cache optimization unit 110.

According to this invention, as a result of the dummy I/O request issued by the I/O request monitoring unit of the service server 200 based on the control policy, the arrangement of the application data stored in the server cache 240 can be optimized. As a result, the processing performance of the application 230 in the service server 200 can be improved.

MODIFIED EXAMPLE

In the data pinning control, the dummy I/O request is issued based on the issuance cycle, but, in a modified example, the dummy I/O request is issued based on an access counter of the server cache 240 managed by the cache driver 213. It should be noted that the access counter is information used to manage the number of accesses blocks of data in the server cache 240.

The computer system configuration, and the configurations of the management server 100, the service server 200, and the storage server 300 according to the modified example are the same as those of the first embodiment, and a description thereof is therefore omitted. The access analysis processing according to the modified example is the same as that of the first embodiment, and a description thereof is therefore omitted.

In the modified example, information stored in the control policy 504 of an entry corresponding to the "data pinning control" in the control information 221 is different. Specifically, an issuance cycle is not set to the control policy 504.

In the modified example, a part of the control information generation processing is different. Specifically, in Step S204, the processing of determining the issuance cycle of the dummy I/O request is not carried out. The other pieces of processing are the same as those of the first embodiment.

In the modified example, a part of the I/O request monitoring processing is different. Specifically, in Step S304, it is determined that the control type is "data pinning control", the I/O request monitoring unit 220 obtains a value of the access counter from the cache driver 213, and inquires of an arrangement (block) on the server cache 240 in which application data requiring the pinning is stored.

The I/O request monitoring unit 220 calculates an average of the numbers of accesses to all the blocks based on the access counter. Further, the I/O request monitoring unit 220 determines whether the number of accesses to the block storing the application data requiring the pinning is more than the calculated average.

In a case where the number of accesses to the block storing the application data requiring the pinning is more than the calculated average, the I/O request monitoring unit 220 proceeds to Step S308. On the other hand, in a case where the number of accesses to the block storing the application data requiring the pinning is equal to or less than the calculated average, the I/O request monitoring unit 220 issues a dummy I/O request (Step S307).

Although the description of each embodiment has been given of the example that adopts software-based control, the control may be partly achieved by hardware.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions. The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system, comprising:
a service server on which one or more applications for carrying out predetermined processing operate;
a storage server for storing data used by the one or more applications; and
a management server for managing the service server and the storage server,
wherein the service server includes a first processor, a first memory coupled to the first processor and storing instructions which are executed by the first processor, a cache device which is coupled to the first processor and to which a server cache for temporarily storing data is set, and a first interface coupled to the first processor for coupling to the management server and the storage server,
wherein the storage server includes a second processor, a second memory coupled to the second processor and storing instructions which are executed by the second processor, a second interface coupled to the second processor for coupling to the service server and the management server, and a plurality of storage devices,
wherein the management server includes a third processor, a third memory coupled to the third processor and storing instructions which are executed by the third processor, and a third interface coupled to the third processor for coupling to the service server and the storage server,
wherein the first processor of the service server executes:
an operating system for controlling the service server, the operating system including a cache driver for controlling the server cache, and
an I/O request monitoring unit for monitoring an I/O request issued by one of the applications, and issuing a dummy I/O request for controlling an arrangement of data in the server cache in a case where a predetermined condition is satisfied,
wherein the third processor of the management server executes:
a cache optimization unit for generating a control policy for issuing the dummy I/O request, and setting the control policy to the I/O request monitoring unit,
the cache optimization unit being configured to instruct the service server to carry out processing,
wherein the I/O request monitoring unit is configured to:
monitor the I/O request issued by the one of the applications operating on the service server, and
transmit monitoring information including an address of data of an access destination included in the I/O request and an identifier of the one of the applications that has issued the I/O request to the cache optimization unit in a case where the I/O request is detected,
wherein the cache optimization unit is configured to analyze the monitoring information and generate the control policy,
wherein the cache optimization unit is further configured to:
determine, based on the monitoring information, whether pinned data necessary to be held in the server cache during the processing being carried out by the one of the applications exists, and
generate a first control policy including a monitoring address, which is an address included in the I/O request issued by the one of the applications and serves as a trigger for starting a timer for controlling an issuance cycle of the dummy I/O request for making access to the pinned data, an address for making access to the pinned data, and the issuance cycle for issuing the dummy I/O request for making access to the pinned data, in a case where it is determined that the pinned data exists, and
wherein the I/O request monitoring unit is further configured to:
monitor the I/O request issued by the one of the applications in a case where the processing by the service server is carried out after the first control policy is set,
start the timer for controlling the issuance cycle for issuing the dummy I/O request for making access to the pinned data in a case where an I/O request including the monitoring address is detected, and
periodically issue, based on the first control policy, the dummy I/O request for making access to the pinned data.

2. The computer system according to claim 1, wherein:
the one or more applications include a first application and a second application which operate on the service server,
the second application starts processing after the first application finishes processing,
the cache optimization unit is further configured to:
determine, based on the monitoring information, whether read-ahead data, which is necessary to be read from the storage server when the processing by the second application starts, exists, and
generate a second control policy including a monitoring address, which is an address included in the I/O request issued by the first application and serves as a trigger for issuing the dummy I/O request for making access to the read-ahead data, and an address for making access to the read-ahead data, in a case where it is determined that the read-ahead data exists, and
the I/O request monitoring unit is further configured to:
monitor the I/O request issued by the first application in a case where the processing by the service server is carried out after the second control policy is set; and
issue, based on the second control policy, the dummy I/O request for making access to the read-ahead data in a case where the I/O request including the monitoring address is detected.

3. The computer system according to claim 1, wherein the first control policy and the second control policy comprise information on an I/O band used when the dummy I/O request is issued.

4. The computer system according to claim 2, wherein the first control policy and the second control policy comprise information on an I/O band used when the dummy I/O request is issued.

5. The computer system according to claim 1, wherein the I/O request monitoring unit is included in the cache driver.

6. The computer system according to claim 2, wherein the I/O request monitoring unit is included in the cache driver.

7. A cash data management method in a computer system, the computer system including:
a service server which one or more applications for carrying out predetermined processing operate;
a storage server for storing data used by the one or more applications; and a management server for managing the service server and the storage server, the service server including a first processor, a first memory coupled to the first processor and storing instructions which are executed by the first processor, a cache device which is coupled to the first processor and to which a server cache for temporarily storing data is set, and a first interface coupled to the first processor for coupling to the management server and the storage server, the storage server including a second processor, a second memory coupled to the second processor and storing instructions which are executed by the second processor, a second interface coupled to the second processor for coupling to the service server and the management server, and a plurality of storage devices, the management server including a third processor, a third memory coupled to the third processor and storing instructions which are executed by the third processor, and a third interface coupled to the third processor for coupling to the service server and the storage server, the first processor of the service server executing:

an operating system for controlling the service server, the operating system including a cache driver for controlling the server cache, and an I/O request monitoring unit for monitoring an I/O request issued by the one of the applications, and issuing a dummy I/O request for controlling an arrangement of data in the server cache in a case where a predetermined condition is satisfied, the third processor of the management server executing a cache optimization unit for generating a control policy for issuing the dummy I/O request, and setting the control policy to the I/O request monitoring unit, the cash data management method comprising:

a first step of instructing, by the cache optimization unit, the service server to carry out processing;

a second step of monitoring, by the I/O request monitoring unit, the I/O request issued by the application operating on the service server;

a third step of transmitting, by the I/O request monitoring unit, monitoring information including an address of data of an access destination included in the I/O request and an identifier of the one of the applications that has issued the I/O request to the cache optimization unit, in a case where the I/O request is detected; and a fourth step of analyzing, by the cache optimization unit, the monitoring information and generating the control policy, the fourth step including:

determining, based on the monitoring information, whether pinned data necessary to be held in the server cache during the processing being carried out by the one of the applications exists, and generating a first control policy including a monitoring address, which is an address included in the I/O request issued by the one of the applications and serves as a trigger for starting a timer for controlling an issuance cycle of the dummy I/O request for making access to the pinned data, an address for making access to the pinned data, and the issuance cycle for issuing the dummy I/O request for making access to the pinned data in a case where it is determined that the pinned data exists;

a fifth step of monitoring, by the I/O request monitoring unit, the I/O request issued by the application in a case where the processing by the service server is carried out after the first control policy is set;

a sixth step of starting, by the I/O request monitoring unit, the timer for controlling the issuance cycle for issuing the dummy I/O request for making access to the pinned data in a case where an I/O request including the monitoring address is detected; and a seventh step of periodically issuing, by the I/O request monitoring unit, based on the first control policy, the dummy I/O request for making access to the pinned data.

8. The cash data management method according to claim 7, wherein:

the one or more applications include a first application and a second application operate on the service server, the second application starts processing after the first application finishes processing, the fourth step further includes:

determining, based on the monitoring information, whether read-ahead data, which is necessary to be read from the storage server in a case where the processing by the second application starts, exists, and generating a second control policy including a monitoring address, which is an address included in the I/O request issued by the first application and serves as a trigger for issuing the dummy I/O request for making access to the read-ahead data, and an address for making access to the read-ahead data, in a case where it is determined that the read-ahead data exists, and the cash data management method further includes the steps of:

monitoring, by the I/O request monitoring unit, the I/O request issued by the first application in a case where the processing by the service server is carried out after the second control policy is set; and issuing, by the I/O request monitoring unit, based on the second control policy, the dummy I/O request for making access to the read-ahead data in a case where an I/O request including the monitoring address is detected.

9. The cash data management method according to claim 7, wherein the first control policy and the second control policy include information on an I/O band used when the dummy I/O request is issued.

10. The cash data management method according to claim 8, wherein the first control policy and the second control policy include information on an I/O band used when the dummy I/O request is issued.

11. The cash data management method according to claim 7, wherein the I/O request monitoring unit is included in the cache driver.

12. The cash data management method according to claim 8, wherein the I/O request monitoring unit is included in the cache driver.

13. A computer on which one or more applications for carrying out predetermined processing operate, comprising:

a processor;

a memory coupled to the processor;

a cache device which is coupled to the processor and to which a cache for temporarily storing data is set; and an interface coupled to the processor for coupling to a storage apparatus for storing data used by the application, wherein the memory storing instructions that cause the processor to execute:

an operating system for controlling the computer, the operating system comprising a cache driver for controlling the cache, an I/O request monitoring unit for monitoring an I/O request issued by one of the applications, and issuing a dummy I/O request for controlling an arrangement of data in the cache in a case where a predetermined condition is satisfied, and a cache optimization unit for generating a control policy for issuing the dummy I/O request, and setting the control policy to the I/O request monitoring unit, wherein the cache optimization unit being configured to instruct execution of the processing, wherein the I/O request monitoring unit is configured to:

monitor the I/O request issued by the one of the applications operating on the computer, and transmit monitoring information including an address of data of an access destination included in the I/O request and an identifier of the one of the applications that has issued the I/O request to the cache optimization unit in a case where the I/O request is detected, wherein the cache optimization unit is configured to analyze the monitoring information and generate the control policy, wherein the cache optimization unit is further configured to:

determine, based on the monitoring information, whether pinned data necessary to be held in the cache during the processing being carried out by the application exists, and generate a first control policy including a monitoring address, which is an address included in the I/O request issued by the one of the applications and serves as a trigger for starting a timer for controlling an issuance cycle of the dummy I/O request for making access to the pinned data, an address for making access to the pinned data, and the issuance cycle for issuing the dummy I/O request for making access to the pinned data in a case where the pinned data is determined to exist, and wherein the I/O request monitoring unit is further configured to:

monitor the I/O request issued by the one of the applications in a case where the processing by the computer is carried out after the first control policy is set, start the timer for controlling the issuance cycle for issuing the dummy I/O request for making access to the pinned data in a case where an I/O request including the monitoring address is detected, and periodically issue, based on the first control policy, the dummy I/O request for making access to the pinned data.

14. The computer according to claim 13, wherein:

the one or more applications include a first application and a second application operate on the computer, the second application starts processing after the first application finishes processing, the cache optimization unit is further configured to:

determine, based on the monitoring information, whether read-ahead data, which is necessary to be read from the storage apparatus when the processing by the second application starts, exists, and generate a second control policy including a monitoring address, which is an address included in the I/O request issued by the first application and serves as a trigger for issuing the dummy I/O request for making access to the read-ahead data, and an address for making access to the read-ahead data in a case where it is determined that the read-ahead data exists, and the I/O request monitoring unit is further configured to:

monitor the I/O request issued by the first application in a case where the processing by the computer is carried out after the second control policy is set, and issue, based on the second control policy, the dummy I/O request for making access to the read-ahead data in a case where an I/O request including the monitoring address is detected.

15. The computer according to claim 13, wherein the first control policy and the second control policy comprise information on an I/O band used when the dummy I/O request is issued.

16. The computer according to claim 14, wherein the first control policy and the second control policy comprise information on an I/O band used when the dummy I/O request is issued.

17. The computer according to claim 13, wherein the I/O request monitoring unit is included in the cache driver.

* * * * *